United States Patent [19]
Hori et al.

[11] Patent Number: 5,614,582
[45] Date of Patent: Mar. 25, 1997

[54] RESINOUS COMPOSITIONS FOR A WATER PAINT

[75] Inventors: Makoto Hori; Reijiro Nishida; Yasuo Takaya; Yasuharu Nakayama; Masami Sugishima, all of Kanagawa, Japan

[73] Assignee: Kansi Paint Co., Ltd., Hyogo, Japan

[21] Appl. No.: 321,870

[22] Filed: Oct. 14, 1994

[30] Foreign Application Priority Data

Oct. 15, 1993 [JP] Japan ................................. 5-289700

[51] Int. Cl.⁶ .................................................. C08L 75/04
[52] U.S. Cl. ...................................... 524/507; 524/840
[58] Field of Search ........................... 524/507, 457, 524/840

[56] References Cited

U.S. PATENT DOCUMENTS

| | | |
|---|---|---|
| 4,267,091 | 5/1981 | Geelhaar et al. . |
| 4,894,261 | 1/1990 | Gulbins et al. . |
| 5,141,983 | 8/1992 | Hasegawa et al. ............... 524/437 |
| 5,147,926 | 9/1992 | Meichsner et al. . |
| 5,348,997 | 9/1994 | Kato et al. . |

FOREIGN PATENT DOCUMENTS

| | | |
|---|---|---|
| 332326 | 9/1989 | European Pat. Off. . |
| 545081 | 6/1993 | European Pat. Off. . |
| 367051 | 6/1993 | European Pat. Off. . |
| 5-98071 | 4/1993 | Japan . |
| 5-247371 | 9/1993 | Japan . |
| 05247376 | 9/1993 | Japan . |
| 5-339542 | 12/1993 | Japan . |
| 5-320299 | 12/1993 | Japan . |

OTHER PUBLICATIONS

Chemical Abstracts No. 273199q, vol. 120, No. 11, May 1994, "Manufacture of Aqueous Emulsions of Acrylic Polyurethanes" (English Abstract of Japanese Patent No. 5-320299 above).

*Primary Examiner*—Jeffrey T. Smith
*Attorney, Agent, or Firm*—Beveridge, DeGrandi, Weilacher & Young, L.L.P.

[57] ABSTRACT

A resinous composition for water paint crosslinkable at the normal temperature is provided, which is suitable for painting interiors and exteriors of buildings, bridges, vehicles and et al, which is non-odored, as well as which has advantages in safe and hygienic aspects. A resinous composition for a water paint, which is obtained by blending an aqueous dispersion of a carbonyl group-containing copolymer (A) with a carbonyl group-containing aqueous polyurethane resin (B) at the ratio of 100 parts by weight of solids in (A) to 5~150 parts by weight of (B), and then adding as a crosslinking agent a hydrazide compound having at least 2 hydrazide groups per one molecule (C) at the ratio of 0.01~2 moles of (C) to 1 mole of carbonyl group contained in the said (A) and (B) components, wherein the said polyurethane resin (B) being obtained by copolymerizing an unsaturated polyurethane resin obtained by the reaction of a diisocyanate compound with a polyol having a number average molecular weight of 60~10,000, a carboxyl group-containing diol and a hydroxyl group-containing ethylenic unsaturated monomer with a carboxyl group-containing ethylene unsaturated monomer.

16 Claims, No Drawings

RESINOUS COMPOSITIONS FOR A WATER PAINT

Background of the Invention

This invention relates to a resinous composition for a water-based paint (hereinafter referred to as water paint) particularly to a resinous composition for a water paint crosslinkable at the normal temperature suitable for painting of the interior and exterior of buildings, bridges, ships, vehicles and the like.

In water paints dryable by crossliking at normal temperature, an aqueous dispersion of an acrylic copolymer has been generally used. For the aqueous dispersion of an acrylic copolymer, emulsion particles are necessary to be fused and adhered to each other. Therefore, it is difficult to increase the Tg (glass transition temperature) of the resin as to the acrylic copolymer used in the water paint dryable at normal temperature due to its film forming property, so that its contamination resistance is lowered and its water resistance and the like also decreases.

On one hand, the market tends to require higher quality year by year, and properties such as paint film elasticity, toughness, contamination resistance, acidic rain resistance and the like equivalent to organic solvent type urethane paints have been increased also in water paints.

On the other hand, with the conventional organic solvent type urethane paints, it is necessary for these to be a suitable undercoat in order to withstand the effect of solvent used, otherwise it is difficult to apply the paint particularly in repainting use. Further, aqueous systems have been recently required because of envionmental hygienic aspects and the fire prevention laws, thus an aqueous polyurethane paint dryable at the normal temperature having the same properties as the organic solvent type urethane paint is strongly desired.

There have been carried out up to now some trials to blend an aqueous dispersion of a carbonyl group-containing copolymer with an aqueous dispersion of a urethane polymer having a hydrazide residue for the purpose of providing a urethane function to an aqueous emulsion (see Japanese Laid-Open Patent Nos. 1-301761/1989 and 1-301762/1989). These compositions, however, did not solve the problem of producing a strong film dryable at normal temperature, and did not possess the desired product properties of rapid drying, water resistance, as well as outdoor stain resistance and acidic rain resistance.

The inventors have previously proposed a water paint dryable at normal temperature in order to solve the above-mentioned problems, which paint is obtained by strenthening the film by using a comparatively low molecular weight crosslinking agent using together with an aqueous dispersion of crosslinkable urethane resin (Japanese Laid-open Patent No. 5-339542/1993). Also, applicants have proposed a composition wherein a polyurethane resin containing a carbonyl group obtained by the reaction of a diisocynate compound (d) with a glycol (e), an alcohol and/or a glycol having a carboxyl group (f) and an alcohol having a carbonyl group (g) is used as an aqueous polyurethane resin (Japanese Patent Application No. 5-205496/1993).

Although the above-mentioned paints has solved some problems of paint films, there remain some problems in safety and hygienic aspects due to use of hydrazine or aqueous hydrazine solution. Furthermore, the water paint according to Japanese Patent Application No. 5-205496/1993 is satisfactory in its paint film properties, but there is a problem of complexity in the procedure for its preparation.

SUMMARY OF THE INVENTION

It is an object of the invention to solve the above-mentioned problems, and to provide for the addition of carbonyl group to the aqueous urethane resin and avoiding use of hydrazine.

The first aspect of the present invention relates to a resinous composition for a water paint, which is obtained by blending an aqueous dispersion of a carbonyl group-containing copolymer (A) with a carbonyl group-containing aqueous polyurethane resin (B) at the ratio of 100 parts by eight of solids in (A) to 5~150 parts by weight of (B), and a crosslinking agent a hydrazide compound having at least 2 hydrazide groups per one molecule (C) at the ratio of 0.01~2 moles of (C) to 1 mole of carbonyl group contained in the said (A) and (B) components, wherein the said polyurethane resin (B) is obtained by copolymerizing an unsaturated polyurethane resin obtained by the reaction of a diisocyanate compound with a polyol having a number average molecular weight of 60~10,000, a carboxyl group-containing diol and a hydroxyl group-containing ethylenic unsaturated monomer, with a carbonyl group-containing ethylenic unsaturated monomer.

The second aspect of the present invention relates to a resinous composition for a water paint according to the first aspect above, wherein the aqueous dispersion of a carbonyl group-containing copolymer (A) is a dispersion of a copolymer obtained by emulsion copolymerization of a monomer mixture containing (a) 0.1~30% by weight of a polymerizable unsaturated monomer having at least one carbonyl group in one molecule, (b) 0~10% by weight of a monomer selected from the group consisting of monoolefinic unsaturated carboxylic acids, monoolefinic unsaturated carboxylic acid amides and N-alkyl or N-alkylol derivatives of monolefinic unsaturated carboxylic acid amides, as well as (c) 60~99.9% by weight of a monomer selected from the group consisting of vinyl aromatic compounds, n-alkyl esters of mathacrylic acids having 1~8 carbon atoms, vinyl esters of saturated carboxylic acids, 1,3-diene, tertially butyl acrylate, vinyl halides, ethylene and methacrylonitrile in the presence of a dispersant.

The third aspect of the present invention relates to a resinous composition for a water paint according to the first or second aspect above, wherein the carbonyl group-containing aqueous polyurethane resin (B) is a resin having acid number of 10~200 per 1 g of the solids in the resin.

The fourth aspect of the present invention relates to a resinous composition for a water paint according to the first through third aspects above, wherein the carbonyl group-containing aqueous polyurethane resin (B) is a resin containing 0.005~0.3 moles of carbonyl group per 100 g of the solids.

The fifth aspect of the present invention relates to a resinous composition for a water paint according to the first through fourth aspects above, wherein the unsaturated polyurethane resin is a polyurethane resin obtained by reacting the isocyanate group with hydroxyl groups at the equivalent ratio of 1:1~1:1.5.

The sixth aspect of the present invention relates to a resinous composition for a water paint according to the first through fifth aspects above, wherein the unsaturated polyurethane resin is obtained by using a hydroxy group-containing ethylenic unsaturated monomer as the hydroxy compound at the ratio of 0.1~1 equivalent to 1 equivalent of isocyanate group.

The seventh aspect of the present invention relates to a resinous composition for a water paint according to the first through sixth aspects above, wherein the crosslinking agent (C) is a dihydrazide compound selected from $$H_2NH-CO-NH-NH_2,$$

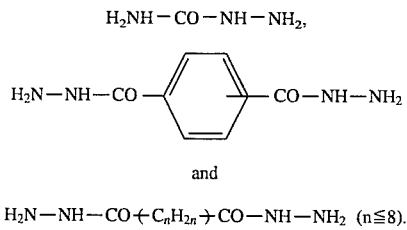

and $$H_2N-NH-CO(C_nH_{2n})CO-NH-NH_2 \ (n \leq 8).$$

The eighth aspect of the present invention relates to a resinous composition for a water paint according to the first through seventh aspects above, wherein the crosslinking agent, the hydrazide compound, may be blended at the ratio of 0.01~2 moles to 1 mole of carbonyl group contained both in the aqueous dispersion of copolymer (A) and the aqueous polyurethane resin (B).

PREFERRED EMBODIMENTS OF THE INVENTION

The aqueous dispersion of a copolymer containing carbonyl group (A) used in the invention is easily obtained by emulsion copolymerization of a monomer mixture preferably containing (a) 0.1~30% by weight of a polymerizable unsaturated monomer having at least one carbonyl group in one molecule, (b) 0~10% by weight of a monomer selected from the group consisting of monoolefinic unsaturated carboxylic acids, monoolefinic unsaturated carboxylic acid amides and N-alkyl or N-alkylol derivatives of monoolefinic unsaturated carboxylic acid amides, as well as (c) 60~99.9% by weight of a monomer selected from the group consisting of vinyl aromatic compounds, n-alkyl esters of acrylic acids having 1~8 carbon atoms, vinyl esters of saturated carboxylic acids, 1,3-diene, tertially butyl acrylate, vinyl halides, ethylene and methacrylonitrile in the presence of a dispersant.

As the monomer (a), those having a polymerizable double bond and at least one carbonyl group in one molecule may be used. As examples of the monomers (a), there may be mentioned acrolein, diacetone(meth)acrylamide, formyl styrol, vinyl alkyl ketones having 4-7 carbon atoms (such as vinyl methyl ketone, vinyl ethyl ketone, vinyl butyl ketone), acetoacetoxyethyl methacrylate and the like. Particularly preferable is diacetonemethacrylamide.

As the monomers (b), there may be mentioned monoolefinic unsaturated carboxylic acids such as methacrylic acid, maleic acid and the like; amide derivatives of the said unsaturated carboxylic acids; N-substituted derivatives of the said unsaturated carboxylic acids such as N-methylol methacrylamide and the like.

As the monomers (c), there may be mentioned vinyl aromatic compounds such as styrene, vinyl toluene and the like; alkyl esters of methacrylic acids such as methyl methacrylate, ethyl methacrylate, butyl methacrylate, 2-ethylhexyl methacrylate and the like; vinyl esters such as vinyl acetate, vinyl propionate and the like in addition to the exemplified monomers.

The aqueous polyurethane resin (B) used in the invention can be prepared by the following method. It was obtained by copolymerizing an aqueous dispersion of an unsaturated polyurethane resin obtained by the urethane reaction of a diisocyanate (d) with a polyol having a number average molecular weight of 60~10,000 (e), a diol having carboxyl group (f) and a hydroxyl group-containing ethylenic unsaturated monomer (g); with a carbonyl group-containing ethylenic unsaturated monomer (h).

As the above-mentioned diisocyanates (d), there may be mentioned 2,4-tolylene diisocyanate, 2,6-tolylene diisocyanate, 4,4'-diphenylmethane diisocyanate, m-phenylene diisocyanate, xylylene diisocyanate, tetramethylene diisocyanate, hexamethylene diisocyanate, lysin diisocyanate, 1,4-cyclohexylene diisocyanate, 4,4'-dicyclohexylmethane diisocyanate, 3,3'-dimethyl-4,4'-biphenylene diisocyanate, 3,3,-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, isophoron diisocyanate and the like.

Among others, aliphatic diisocyanates such as tetramethylene diisocyanate, 2,2,4-trimethylhexane diisocyanate, hexamethylene diisocyanate, lysin diisocyanate, as well as alicyclic diisocyanates such as 1,4-cyclohexylene diisocyanate, 4,4'-dicyclohexylmethane diisocyanate, isophoron diisocyanate and the like are preferable.

As polyols (e), there by be used low molecular weight glycols, high molecular weight glycols, polyester polyols, polycarbonate polyols and the like individually, or there may be used polyester polyols or high molecular weight glycols together with low molecular weight glycols.

As low molecular weight glycols, there may be mentioned ethylene glycol, diethylene glycol, triethylene glycol, 1,2-propylene glycol, 1,3-butylene glycol, tetramethylene glycol, hexamethylene glycol, decametylene glycol, octandiol, tricyclodecane dimethylol, hydrogenated bisphenol A, cyclohexane dimethanol, bisphenol A polyethylene glycol ether, bisphenol A polypropylene glycol ether and the like, which may be used individually or in admixture of 2 or more than 2 kinds.

As high molecular weight polyglycols, there may be mentioned polyethylene glycol, polypropylene glycol, polytetramethylene glycol and the like.

Polyester polyols are the reaction products of a glycol component and a dicarboxylic acid component, and they are easily prepared by any known method. Thus, they can be prepared not only by esterification reactions but also by transesterification reactions.

Furthermore, there may be included polyester diols obtained by the ring-opening reaction of a cyclic ester compound such as ε-caprolactone and their cocondensed polyesters.

As carboxyl group-containing diols (f), there may be mentioned 2,2-dimethylol propionic acid, 2,2-dimethylol butyric acid, 2,2-dimethylol valeric acid and polyester polyols or polyether polyols obtained by condensation thereof. They can be used together with hydroxycarboxylic acids such as 12-hydroxystearic acid, paraoxybenzoic acid, 2,2-dimethyl-3-hydroxypropionic acid, salicylic acid and the like.

As hydroxyl group-containing ethylenic unsaturated monomer (g), there may be mentioned methacrylates such as 2-hydroxyethyl methacrylate, hydroxypropyl methacrylate, hydroxybutyl methacrylate, polyethylene glycol-monomethacrylate, polyethylene glycol-mono methacrylate, polypropylene glycol-mono methacrylate, ε-caprolactone polyadduct of 2-hydroxyethylmethacrylate, β-methyl-δ-valerolactone polyadduct of 2-hydroxyethylmethacrylate, glycerol monomethacrylate, glycerol dimethacrylate and the like; allyl compounds such as allyl alcohol, glycerol menoallyl ether, glycerol diallyl ether; as well as alkylene oxide (with 2–4 carbon atoms preferably) adducts (added mole number of the alkylene oxide being generally 0–30 moles, more preferably 30–20 moles) thereof and the like.

The synthesis reaction of the unsaturated polyurethane resin may be carried out in any organic solvent, but it is desirably carried out in an organic solvent which is inactive to the isocyanate group and which has high compatibility with water, such as dioxane, acetone, methyl ethyl ketone, methyl isobutyl ketone, N-methyl pyrrolidone, tetrahydrofuran and the like.

In the synthesis reaction of the unsaturated polyurethane resin, a monohydric alcohol may be blended if necessary for the purpose of sequestering excess isocyanate groups in addition to the above-mentioned (d), (e), (f) and (g). The proportions of these (d), (e), (f) and (g) may be changed variously, but generally it is within such an equivalent ratio between isocyanate group and hydroxyl group in all components of 1:1–1:1.5, preferably 1:1–1:1.3.

The amount of (g) component used therein may be 0.01–1, preferably 0.02–0.8, equivalents to 1 equivalent of isocyanate group.

Preparation of the unsaturated polyurethane resin is not limited to any one method, and diisocyanate (d), a polyol (e), a carboxyl group-containing diol (f) and a hydroxyl group-containing ethylenic unsaturated monomer (g) may be reacted simultaneously, or the resin may be prepared by multi-step reaction method. In the latter case, a diisocyanate is reacted with a part of the polyol and a carboxyl group-containing diol to synthesize a prepolymer having the isocyanate end, and thereafter the remainder of the polyol and a hydroxyl group-containing ethylenic unsaturated monomer are reacted with the prepolymer. Generally, the reaction may be carried out at the temperature of 40°–180° C., preferably 60°–130° C.

In order to accelerate the reaction, there may be used amine type catalysts generally used in the conventional urethane reactions, such as triethylamine, N-ethyl morpholine, triethyldiamine and the like, as well as tin type catalysts such as dibutyl tin dilaurate, dioctyl tin dilaurate and the like. Furthermore, in order to prevent polymerization of an ethylenic unsaturated compound during the urethane reaction, there may be used hydroquinone, hydroquinone monomethyl ether, p-benzoquinone and the like.

The unsaturated urethane resin prepared as described above is then dispersed into water. Dispersing may be carried out by any conventional known method, without limitation. Thus, the polyurethane resin may be added to water (optionally, containing a chain extender, a neutralizing agent, a surfactant and the like) with stirring to mix and disperse, or may be mixed continuously.

As the neutralizing agent, there is no limitation except that it be able to neutralize carboxyl groups, and there may be mentioned sodium hydroxide, potassium hydroxide, trimethylamine, dimethylaminoethanol, 2-methyl-2-aminopropanol, triethylamine, ammonia and the like.

The neutralizing agent may be added to the resin to neutralize the carboxyl group, or added to water which is used as a dispersing medium to neutralize simultaneously with dispersing. The amount used may be such that the proportion is 0.5–2.0, preferably 0.7–1.3, equivalents to 1 equivalent of carboxyl group.

The concentration of solids in the aqueous dispersion of an unsaturated polyurethane resin thus obtained may be generally be 20–50% by weight, and the viscosity thereof may be in a range of 5–5000 mpa (25° C.).

The aqueous dispersion of an unsaturated polyurethane resin is then copolymerized with a carbonyl group-containing unsaturated monomer (h) by any known method to synthesize a carbonyl group-containing aqueous polyurethane resin (B). As the carbonyl group-containing unsaturated monomers (h), there may be used monomers having at least one carbonyl group in one molecule and polymerizable double bond. As examples thereof, there may be mentioned acrolein, diacetone methacrylamide, formyl styrol, acetoacetoxyethylmethacrylate, vinyl alkyl ketones having 4–7 carbon atoms (such as vinyl methyl ketone, vinyl ethyl ketone, vinyl butyl ketone) and the like. Particularly preferable are diacetone methacrylamide and acetoacetoxyethylmethacrylate.

During the synthesis, there may be used if necessary unsaturated monomers such as alkyl esters of methacrylic acids (methyl methacrylate, butyl methacrylate and the like), hydroxyalkyl esters of methacrylic acids (hydroxyethyl methacrylate and the like), dialkyl aminoalkyl methacrylates (dimethylaminoethyl methacrylate and the like), methacrylamides, methacrylonitriles, aromatic vinyl monomers (styrene, vinyl toluene and the like). Furthermore, an azo type initiator such as azoisovaleronitrile may be used as a polymerization initiator, and known additives such as peroxides may be used. A reducing agent such as formaldehyde sodium sulfoxylate may be used for the purpose of lowering the polymerization temperature.

In the above-mentioned synthesis, the amounts used of the carbonyl group-containing unsaturated monomer (h) and the other unsaturated monomers may be totally within a range of 0.1–100 parts by weight, preferably 0.2–65 parts by weight, to 100 parts by weight of solids in the aqueous dispersion of the unsaturated polyurethane resin. Among others, the amount of the unsaturated monomer (h) may be within a range such that carbonyl group content is 0,005–0.3 moles, preferably 0.01–0.2 moles per 100 g of the obtained carbonyl group-containing aqueous polyurethane resin (B). At a carbonyl group content below 0,005 moles, there may not be obtained a satisfactory crosslinking effect, and above 3 moles, storage stability of the paint may be lowered.

The acid number in the thus obtained carbonyl group-containing aqueous polyurethane resin (B) is preferably 10–200 per 1 g of resinous solids. Without the said range, dissolving or dispersing into water may become difficult, or in the case of paint film forming, water resistance and the like are lowered.

According to the invention, a blending ratio between the aqueous dispersion of a carbonyl group-containing copolymer (A) and the carbonyl group-containing aqueous polyurethane resin (B) is 5–150 parts by weight, preferably 10–100 parts by weight, more preferably 10–80 parts by weight of (B) per 100 parts by weight of solids in (A). At the ratio below 5 parts by weight, improving effects in physical properties are poor, and above 150 parts by weight, weather resistance, water resistance, elasticity and the like are lowered.

The crosslinking agents (C) used in the invention are $H_2N-NH-CO-NH-NH_2$ (dihydrazine ketone), $H_2N-NH-CO-CO-$ $H_2N-NH-CO-NH-NH_2$ (dihydrazine ketone),

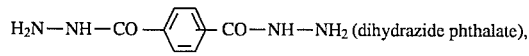

dihydrazide compounds expressed by $H_2N-NH-CO-(C_nH_{2n})-CO-NH-NH_2$ (n≦8), and dihydrazide fumarate.

—CO—NH—NH$_2$ (dihydrazide phthalate),
dihydrazide compounds expressed by
$H_2N-NH-CO-(C_nH_{2n})-CO-NH-NH_2$ (n≦8), and
dihydrazide fumarate.

Among others, those of the general formula wherein n is 1~6 are preferable, and adipic dihyrazide wherein n=4 is particularly preferable.

According to the invention, the blending proportion of the dihydrazide compound (C) used as the crosslinking agent is such that 0.01~2 moles, preferably 0.05~1 moles, of hydrazide to 1 mole of carbonyl group are contained in the aqueous dispersion of copolymer (A) and the aqueous polyurethane resin (B).

At the proportion below 0.01 moles, there cannot be obtained sufficient crosslinking effect and there occurs a problem of weakening during film forming. On the other hand, if the blending proportion above 2 moles, there cannot be obtained any additional effect to the desired crosslinking effect.

According to the invention, the problem of weakening of the aqueous emulsion paint during film forming may be solved, and furthermore, toughness, durability, stain resistance and elasticity originating from the urethane resin as well as weather resistance originating from the acrylic resin effectively produced, by mixing the aqueous dispersion of a carbonyl group-containing copolymer with the carbonyl group-containing aqueous polyurethane resin and the crosslinking agent, a dihydrazide compound, to react and crosslink the carbonyl group of the aqueous dispersion of acrylic copolymer and carbonyl group of the aqueous urethane resin with the hydrazide group of the crosslinking agent. Furthermore, it is not necessary to use hydrazine and the like during preparation of the aqueous urethane resin, so that the safety and hygienic aspects may be improved.

In preparation of the paints according to the invention, if appropriate, there may be used pigments, fillers, aggregates, pigment dispersant, wetting agents, thickeners, defoamers, plasticizers, film forming auxiliaries, organic solvents, preservatives, anti-fungal agents, pH controlling agents, rust preventives and the like by selection and combination corresponding to the respective purposes using conventional methods.

The compositions according to the invention are suitable for painting of building exteriors, bridges, vehicles and the like since they are superior in weather resistance, drying property, water resistance, elasticity, toughness, stain resistance and acidic rain durability. They also have usefulness for interior applications since they have more advantages as the aqueous paints in safety and odor aspects than the conventional solvent type paints.

EXAMPLES

The invention is illustrated in more detail by the following examples.

1. Preparation Examples of Aqueous Emulsions
Preparation Example 1

312 parts by weight of demineralized water and 2.3 parts by weight of NEWCOL 707 SF (an anionic surface active agent of polyoxyethylene arylether sulfateammonium manufactured by Nippon Nyukazai Co., Ltd., solid content 30% by weight) were added to a 2 liter four necked flask, covered with nitrogen, and thereafter kept at 80° C. 0.7 parts by weight of ammonium persulfate was added immediately before dropwise addition of a preemulsion having the following composition, and then the preemulsion was added dripwise for 3 hours:

| | |
|---|---|
| demineralized water | 338 parts by weight |
| diacetone acrylamide | 32 parts by weight |
| acrylic acid | 3.2 parts by weight |
| styrene | 97 parts by weight |
| methyl methacrylate | 260 parts by weight |
| 2-ethylhexyl acrylate | 100 parts by weight |
| n-butyl acrylate | 150 parts by weight |
| NEWCOL 707SF | 62 parts by weight |
| ammonium persulfate | 1.2 parts by weight |

From 30 minutes after the end of dropwise addition, a solution of 0.7 parts by weight of ammonium persulfate dissolved in 7 parts by weight of water was added dropwise for 30 minutes, kept at 80° C. for further 2 hours, then the temperature was lowered to about 40~60° C., and thereafter the pH was adjusted to 8~9 with an aqueous ammonia to obtain Emulsion A-1.

Preparation Example 2

Emulsion A-2 was obtained by the method analogous to Preparation Example 1 except that the preemulsion added dropwise had the following composition:

| | |
|---|---|
| demineralized water | 315 parts by weight |
| diacetone acrylamide | 74 parts by weight |
| acrylic acid | 3.9 parts by weight |
| styrene | 105 parts by weight |
| methyl methacrylate | 269 parts by weight |
| 2-ethylhexyl acrylate | 105 parts by weight |
| n-butyl acrylate | 176 parts by weight |
| hydroxyethyl acrylate | 15 parts by weight |
| NEWCOL 707SF | 49 parts by weight |
| ammonium persulfate | 1.5 parts by weight |

Herein, the ammonium persulfate added after the end of the reaction was the solution obtained by dissolving 0.8 parts by weight of the persulfate into 8 parts by weight of demineralized water.

Property values of Emulsions A-1 and A-2 obtained by the above-mentioned Preparation Examples 1 and 2 are shown in Table 1.

TABLE 1

| Emulsion | Solid Content[1] (%) | pH | Particle Diameter[2] (μm) |
|---|---|---|---|
| A-1 | 51.2 | 8.2 | 0.06 |
| A-2 | 55.5 | 8.4 | 0.17 |

Note:
[1]Solid content was obtained by heating sample at 150° C. for 30 minutes, determining the residual amount, and calculating therefrom.
[2]In determination of emulsion particle diameter, O.D. (Optical Density: Absorbance) of the diluted emulsion which being diluted

TABLE 1-continued to have 0.1~1.0 of O.D. was determined at 420 nm and 700 nm, then O.D. ratio (absorbance ratio) was calculated by using the following formula, and the average particle diameter were determined by means of the working curve described in Bull, 42 Industrial Chemical Research 142 (1964): O.D. ratio = O.D.(430 nm)/ O.D.(700 NM)

2. Preparation examples of aqueous polyurethane resins
Preparation Example 1

860 parts by weight of KYOWANOL D (manufactured by Kyowa Hakko Co. Ltd., TEXANOL isobutyl ether. TEXANOL is 2,2,4-trimethyle-1,3-pentanediol), 2,000 parts by weight of polypropylene glycol (molecular weight: about 1,000), 740 parts by weight of polycaprolactone diol (molecular weight: about 530) and 210 parts by weight of 2,2'-dimethylol propionic acid were introduced in a 2 liter four-necked flask, the temperature was raised to 100° C. and 1,110 parts by weight of isophoron diisocyanate was added dropwise. After the end of dropwise addition, it was stirred at 100° C. After 1 hour, when the concentration of isocyanate group became 0.41 meg/g, 195 parts by weight of hydroxyethyl methacrylate and 37 parts by weight of n-butyl alcohol were added, then stirred at 100° C. for 2 hours. It was thereafter cooled to 40° C., and 162 parts by weight of triethylamine and 9,000 parts by weight of demineralized water were added, to obtain an aqueous dispersion of an unsaturated polyurethane resin having solid content of 30% by weight.

Into 100 parts by weight of the aqueous dispersion of the unsaturated polyurethane resin, 3 parts by weight of diacetone acrylamide was added, the temperature was raised to 60° C., and thereafter a solution of 0.2 parts by weight of t-butyl hydroperoxide dissolved in 5 parts by weight of demineralized water and a solution of 0.2 parts by weight of formaldehyde sodium sulfoxylate dissolved in 5 parts by weight of demineralized water were added dropwise separately for 1 hours. It was then left to cure at 60° C. for 30 minutes, and thereafter cooled, to obtain a carbonyl group-containing aqueous polyurethane resin B-1, pH thereof was 8.5 and acid number thereof was 20.

Preparation Example 2

500 parts by weight of polypropylene glycol (molecular weight: about 1,000), 500 parts by weight of polytetramethylene glycol (molecular weight: about 1,000), 0.5 parts by weight of hydroquinone, 134 parts by weight of 2,2'-dimethylol propionic acid and 232 parts by weight of hydroxyethyl acrylate were introduced in a 2 liter four-necked flask. The temperature was raised to 100° C., and 504 parts by weight of hexamethylene diisocyanate was added dropwise. After the end of dropwise addition, it was stirred at 100° C. for 2 hours, and after confirming that the isocyanate concentration was about 0, cooled to 40°C. 68 parts by weight of 25% aqueous ammonia solution and 9,295 parts by weight of demineralized water were added, to obtain an aqueous dispersion of unsaturated polyurethane resin having solid content of 30% by weight.

Into 333 parts by weight of the aqueous dispersion of the unsaturated polyurethane resin so obtained, 20 parts by weight of acetoacetoxyethyl methacrylate, 30 parts by weight of n-butyl acrylate and 117 parts by weight of demineralized water were added. The temperature was raised to 70°C., and 3 parts by weight of azobisisovaleronitrile was added, matured at 70° C. for 3 hours, and cooled to obtain a carbonyl group-containing aqueous polyurethane resin B-2. The pH thereof was 8.3 and the acid number thereof was 20.

3. Preparation of Resinous Mixed Solutions 470 parts by weight of Emulsion A-1, 232 parts by weight of aqueous urethane resin B-1 and 0.75 parts by weight of adipic dihydrazide were introduced into a 1 liter stainless steel vessel, and stirred, to obtain a resinous mixed solution D-1.

Analogously, resinous mixed solutions D-2~D-8 with blending ratios represented in table 2 were obtained.

TABLE 2

|  | D-1 | D-2 | D-3 | D-4 | D-5 | D-6 | D-7 | D-8 | D-9 | D-10 |
|---|---|---|---|---|---|---|---|---|---|---|
| Emulsion A-1 | 470 | 470 | 470 | 490 | 392 | 294 |  | 470 | 470 | 196 |
| Emulsion A-2 |  |  |  |  |  |  | 382 |  |  |  |
| Aqueous Urethane B-1 | 232 | 232 | 232 | 81 | 323 | 484 | 232 |  | 232 | 548 |
| Aqueous Urethane B-2 |  |  |  |  |  |  |  | 240 |  |  |
| Adipic Dihydrazide | 0.75 | 6.0 | 15.0 | 5.5 | 5.6 | 5.3 | 10.0 | 4.9 | — | 4.6 |
| Total | 702.75 | 708.00 | 717.00 | 576.50 | 720.60 | 783.30 | 624.90 | 714.90 | 702.00 | 748.60 |
| Hydrazide Group/ Carbonyl Group | 0.1 | 0.8 | 2.0 | 0.8 | 0.8 | 0.8 | 0.8 | 0.8 | — | 0.8 |
| (B)/(A) Solids Ratio | 30/100 | 30/100 | 30/100 | 10/100 | 50/100 | 100/100 | 30/100 | 30/100 | 30/100 | 170/100 |

4. Preparation of Paints

Raw materials having the following composition were introduced into a 5 liter stainless steel vessel, and stirred by means of a disperses for 20~40 minutes, to obtain a pigment disperse paste:

| | |
|---|---|
| distilled water | 960 parts by weight |
| ethylene glycolamide | 240 parts by weight |
| Nopcosparts 44C [3] | 60 parts by weight |
| SN defoamer 364 [4] | 84 parts by weight |
| Fujichemi HEC KF=100 [5] | 36 parts by weight |
| titanium White JR-600A [6] | 2640 parts by weight |
| Total | 4020 parts by weight |

Note:
[3] Manufactured by Sannopko Co. Ltd., pigment dispersant
[4] Manufactured by Sannopko Co. Ltd., defoamer
[5] Manufactured by Fuji Chemical Co. Ltd., thickener
[6] Manufactured by Teika Co. Ltd., White color pigment 201 parts by weight of the pigment disperse paste was introduced into a 1 liter stainless steel vessel, and an additional 422 parts by weight of the resinous mixed solution and 18 parts by weight of TEXANOL were added with stirring, and pH was adjusted to 7~9 with an aqueous ammonia, to obtain Paint E-1.

Analogously, Paints E-2~E-10 were prepared by using the resinous mixed solutions D-2~D-8. Property values of the above-mentioned Paints E-2~E-10 are shown in Table 3.

TABLE 3

|  |  | E-1 | E-2 | E-3 | E-4 | E-5 | E-6 | E-7 | E-8 | E-9 | E-10 |
|---|---|---|---|---|---|---|---|---|---|---|---|
| Paint Blending | Disperse Paste | 201 | 201 | 201 | 201 | 201 | 201 | 201 | 201 | 201 | 201 |
|  | Resinous Mixed | D-1 | D-2 | D3 | D-4 | D-5 | D-6 | D-7 | D-8 | D-9 | D-10 |
|  | Solution | 422 | 425 | 430 | 392 | 450 | 488 | 415 | 429 | 421 | 520 |
|  | TEXANOL | 18 | 18 | 18 | 18 | 18 | 18 | 18 | 18 | 18 | 18 |
| Property Values of Paint | Total | 641 | 644 | 649 | 611 | 669 | 7078 | 634 | 648 | 640 | 739 |
|  | Viscosity (25%, Ku value) | 78 | 79 | 78 | 85 | 75 | 70 | 77 | 78 | 78 | 60 |
|  | pH (20° C.) | 8.0 | 8.1 | 8.1 | 8.2 | 8.0 | 8.2 | 8.3 | 8.1 | 8.0 | 7.9 |
|  | Solids (%) | 52.0 | 51.4 | 51.3 | 54.2 | 50.0 | 47.0 | 52.2 | 51.0 | 52.0 | 43.3 |
|  | PVC (%) | 15 | 15 | 15 | 15 | 15 | 15 | 15 | 15 | 15 | 15 |

Tests and Results

EXAMPLES 1~8 AND COMPARATIVE EXAMPLES 1~3

Paints E-1~E-10 were diluted with distilled water by 0~8%, and test plates were prepared by the following method.

ESCO (manufactured by Kansai Paint Co. Ltd., epoxy-amine type anti-rusting undercoat) was painted on the both sides of 70×150×0.8 mm bonded plates, and after 24 hours, Paints E-1~E-10 were painted on one side by means of an air spray at the painted amount of 120 g/m$^2$. Furthers, after drying for 2 hours, the same paints were overprinted by means of the air spray at the painted amount of 120 g/m$^2$.

The test plates obtained were subjected to the following tests. Results are shown in Table 4.

(1) Water Resistant Test (A)

After the above-mentioned test plates were painted, they were dried under such conditions that the temperature of 20° C. and the relative humidity of 75% for 2 hours, and thereafter the tests plates were submerged half into distilled water at 20° C. drawn up after 1 hours, and then painted surfaces were evaluated visually. The results are shown in Table 4 with the following symbols:

◎: No change;

o: Partial expansion;

□: Whole expansion;

x: Elution of paint.

(2) Water Resistant Test

After the above-mentioned test plates were painted, they were dried under such conditions that the temperature of 20° C. and the relative humidity of 75% for 7 days, and thereafter the tests plates were submerged half into distilled water at 20° C., drawn up after 5 days, and then coated surfaces were evaluated visually. The results are shown in Table 4 with the following symbols:

◎: No change;

o: Partial expansion;

□: Whole expansion;

x: Elution of paint.

(3) Accelerated Weathering Test

The above-mentioned test plates were subjected to a Sunshine Weather-O-Meter test for 1,500 hours, and weather resistance was evaluated from calculation of gloss retention by using the following formula:

$$\text{gloss retention (\%)} = \frac{60° \text{ gloss after 1500 hours test}}{60° \text{ gloss before test}} \times 100$$

The results are shown in Table 4.

(4) Tukon Hardness Test

Paints E-1~E-11 were painted on glass plates by means of a 6 mil blade, dried for 10 days at the room temperature, and thereafter Tukon hardness was determined.

(5) JIS A6910 Waterproof Standard Tests (a) Tensile test

ALES GUMTILE rough (manufactured by Kansai Paint Co. Ltd., main reagent for thick painting as exterior use) was drawn painted by means of a 2 mm blade, and after 24 hours, Paints E-1~E-11 were painted to 100 g/m$^2$ respectively by means of a brush. Further, after 2 hours, the same paints were overprinted analogously thereafter, they were processed according to the standard of JIS A6910, and pierced by means of a No. 2 dumbbell to make test pieces, which were subjected to tensile tests at 20° C. and 10° C.

The results of the tensile are shown in Table 4.

(b) Warm and Cool Repeated Test

Test plates were prepared according to the standard of JIS A6910 by using ALES GUMTILE sealer (manufactured by Kansai Paint Co. Ltd., sealer) as an undercoat, ALES GUMTILE rough as a main paint, and E-1~E11 respectively as overprinting, then the warm and cool repeated test was carried out according to the standard for 10 cycles, and thereafter evaluated by the following evaluation standard, the results of which are shown in Table 4:

◎: No abnormality in painted film;

o: Partial expansion in painted film;

□: Whole expansion of painted film;

x: Observable crack in painted film.

TABLE 4

|  | Example | | | | | | | Comparative Example | | |
|---|---|---|---|---|---|---|---|---|---|---|
|  | 1 | 2 | 3 | 4 | 5 | 6 | 7 | 1 | 2 | 3 |
| Paint | E-1 | E-2 | E-3 | E-4 | E-5 | E-6 | E-7 | E-8 | E-9 | E-10 |
| Water Resistance Test (A) | o | ◎ | ◎ | ◎ | ◎ | ◎ | ◎ | o | x | ◎ |
| Water Resistance Test (B) | o | o | o | o | o | o | o | □ | □ | x |

TABLE 4-continued

|  | Example | | | | | | | Comparative Example | | |
|---|---|---|---|---|---|---|---|---|---|---|
|  | 1 | 2 | 3 | 4 | 5 | 6 | 7 | 1 | 2 | 3 |
| Gloss Retention (%) | 78 | 82 | 82 | 85 | 80 | 55 | 80 | 26 | 35 | 17 |
| Tukon Hardness | 1.5 | 2.5 | 3.5 | 0.9 | 4.2 | 4.5 | 3.5 | 1.7 | 0.5 | 2.5 |
| JIS Tensile (%) (20° C.) | 255 | 205 | 215 | 280 | 195 | 150 | 180 | 220 | 250 | 60 |
| Test Tensile (%) (20° C.) | 22 | 25 | 21 | 20 | 29 | 30 | 22 | 7 | 10 | 2 |
| Warm and Cool Repeated Test | o | ⊚ | ⊚ | ⊚ | ⊚ | ⊚ | ⊚ | □ | □ | x |

Apparently from Table 4, the compositions according to the invention were well balanced and eminently superior in water resistance, weather resistance and tensile of painted film (particularly at -10° C.) compared with paints not fulfilling the necessary conditions of the invention (Comparative Examples 1~3), and particularly compared with one (Comparative Example 1) wherein the aqueous polyurethane without carbonyl group is blended with the aqueous dispersion of a carbonyl group-containing copolymer and the dihydrazide compound. It is obviously seen that the compositions according to the invention are remarkably improved in weather resistance, painted film hardness and JIS aptitude.

What is claimed is:

1. A resinous composition for use in an aqueous emulsion paint, which is obtained by blending an aqueous dispersion of a carbonyl group-containing copolymer (A) with a carbonyl group-containing aqueous polyurethane resin (B) at a ratio of 100 parts by weight of solids in (A) to 5–150 parts by weight of (B), and as a crosslinking agent a hydrazide compound having at least 2 hydrazide groups per one molecule (C) at a ratio of 0.01–2 moles of (C) to 1 mole of carbonyl group contained in said (A) and (B) components to thereby obtain a blend of (A), (B) and (C), capable of drying at normal conditions to produce water resistant film, wherein said carbonyl group-containing polyurethane resin (B) is obtained by copolymerizing an unsaturated polyurethane resin obtained by reacting a diisocyanate compound with a polyol having a number average molecular weight of 60–10,000, a carboxyl group-containing diol and a hydroxyl group-containing ethylenic unsaturated monomer, with a carbonyl group-containing ethylene unsaturated monomer.

2. The resinous composition according to claim 1, wherein the aqueous dispersion of a carbonyl group-containing copolymer (A) is a dispersion of a copolymer obtained by emulsion copolymerization of a monomer mixture containing (a) 0.1–30% by weight of a polymerizable unsaturated monomer having a least one carbonyl group in one molecule (b) 0–10% by weight of a monomer selected from the group consisting of a monoolefinic unsaturated carboxylic acid, monoolefinic unsaturated carboxylic acid amide and a N-alkyl or N-alkylol derivative of a monoolefinic unsaturated carboxylic acid amide, as well as (c) 60–99.9% by weight of a monomer selected from the group consisting of a vinyl aromatic compound, n-alkyl ester of methacrylic acid having 1–8 carbon atoms, vinyl ester of saturated carboxylic acid, 1,3-diene, tertially butyl acrylate, vinyl halide, ethylene and methacrylonitrile, in the presence of a dispersant.

3. The resinous composition according to claim 1, wherein the carbonyl group-containing aqueous polyurethane resin (B) is a resin having an acid number of 1–200 per 1 g of the solids in the resin.

4. The resinous composition according to claim 1, wherein the carbonyl group-containing aqueous polyurethane resin (B) is a resin containing 0.005–0.3 moles of carbonyl group per 100 g of the solids.

5. The resinous composition according to claim 1, wherein the unsaturated polyurethane resin is a polyurethane resin obtained by reacting an isocyanate group with hydroxyl group at the equivalent ratio of 1:1–1:1.5.

6. The resinous composition according to claim 1, wherein the unsaturated polyurethane resin is obtained by using a hydroxy group-containing ethylenic unsaturated monomer as the hydroxy compound at the ratio of 0.1–1 equivalents to 1 equivalent of isocyanate group.

7. The resinous composition according to claim 1, wherein the crosslinking agent (C) is a dihydrazide compound selected from

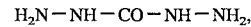

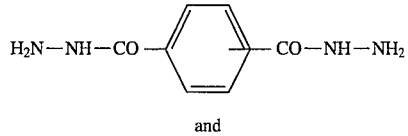

and

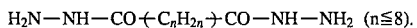

8. The resinous composition according to claim 1, wherein the crosslinking agent is blended at the ratio of 0.05–1 moles to 1 mole of carbonyl group contained both in the aqueous dispersion of copolymer (A) and the aqueous polyurethane resin (B).

9. A water based paint containing the resinous composition according to claim 1.

10. A water based paint containing the resinous composition according to claim 2.

11. A water based paint containing the resinous composition according to claim 3.

12. A method for making a resinous composition for use in an aqueous emulsion paint, comprising blending an aqueous dispersion of a carbonyl group-containing copolymer (A) with a carbonyl group-containing aqueous polyurethane resin (B) at a ratio of 100 parts by weight of solids in (A) to 5–150 parts by weight of (B), and a hydrazide compound crosslinking agent having at least 2 hydrazide groups per one molecule (C) at a ratio of 0.01–2 moles of (C) to 1 mole of carbonyl group contained in the said (A) and (B) components, to thereby obtain a blend of (A), (B) and (C) capable of drying at normal conditions to produce a water resistant film, wherein said carbonyl group-containing polyurethane resin (B) is obtained by copolymerizing an unsaturated polyurethane resin obtained by reaction of a diisocyanate compound with a polyol having a number average molecular weight of 60–10,000, a carboxyl group-containing diol and a hydroxyl group-containing ethylenic unsaturated monomer, with a carbonyl group-containing ethylene unsaturated monomer.

13. The method according to claim 12, wherein the aqueous dispersion of a carbonyl group-containing copolymer (A) is a dispersion of a copolymer obtained by emulsion copolymerization of a monomer mixture containing (a) 0.1–30% by weight of a polymerizable unsaturated monomer having at least one carbonyl group in one molecule (b) 0–10% by weight of a monomer selected from the group consisting of a monoolefinic unsaturated carboxylic acid, monoolefinic unsaturated carboxylic acid amide an a N-alkyl or N-alkylol derivative of a monoolefinic unsaturated carboxylic acid amide, as well as (c) 60–99.9% by weight of a monomer selected from the group consisting of a vinyl aromatic compound, n-alkyl ester of methacrylic acid having 1–8 carbon atoms, vinyl ester of saturated carboxylic acid, 1,3-diene, tertially butyl acrylate, vinyl halide, ethylene and methacrylonitrile, in the presence of a dispersant.

14. The method according to claim 12, wherein the carbonyl group-containing aqueous polyurethane resin (B) is a resin having an acid number of 1–200 per 1 g of the solids in the resin.

15. The method according to claim 12, wherein the carbonyl group-containing aqueous polyurethane resin (B) is a resin containing 0.005–0.3 moles of carbonyl group per 100 g of the solids.

16. The method according to claim 12, wherein the unsaturated polyurethane resin is a polyurethane resin obtained by reacting an isocyanate group with hydroxyl group at the equivalent ratio of 1:1–1:1.5.

* * * * *